UNITED STATES PATENT OFFICE.

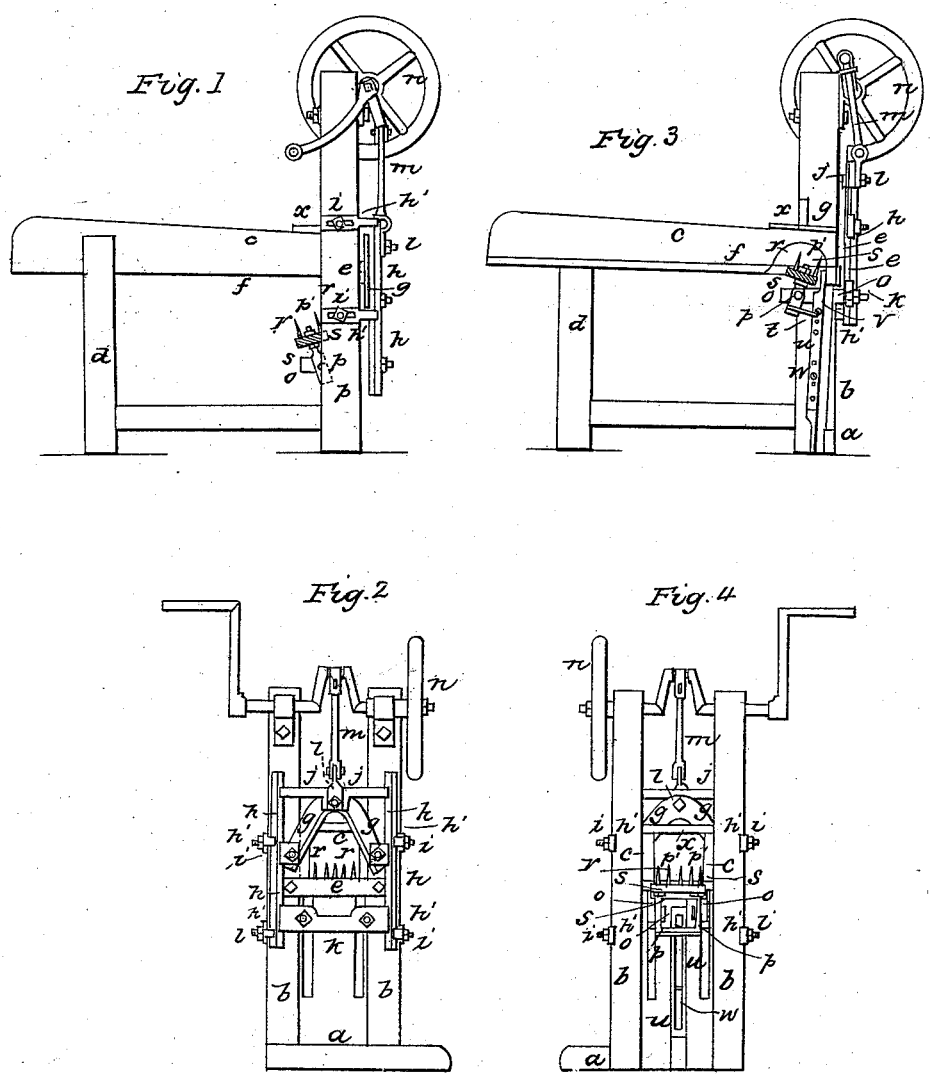

DAVID STILES, JR., OF MIDDLETON, MASSACHUSETTS.

FEEDING APPARATUS OF STRAW-CUTTERS.

Specification of Letters Patent No. 7,514, dated July 16, 1850.

*To all whom it may concern:*

Be it known that I, DAVID STILES, Jr., of Middleton, Essex county, in the State of Massachusetts, have invented new and useful Improvements in Hay and Straw Cutters; and I hereby declare the following to be a full, clear, and exact description of the nature, construction, and operation of the same, reference being had to the annexed drawings, making a part of this specification.

The following are some of the most distinguishing features of my machine.

All the disadvantages severally pertaining to hand acting feeds, or feeding in the hay or straw by hand, and those actuated by the machine itself are here avoided—for instance, I avoid the great expenditure of power involved in the ordinary feed rollers on the one hand, and I avoid the inconvenience and danger to the fingers of the operator that attends a hand feed. Moreover my self acting feed hand by acting on the hay and straw from below, where it lies most compactly and out of the way, performs its work with more precision, than does the ordinary feed hand. The direct action of the cutter facilities its working and avoids the jarring and surging effects of an oblique cut, so destructive, both of knives and of the whole machine. The opening immediately behind the knives favors the escape of grit, sticks, and other foreign and refractory particles which tend to turn, or blunt the edge of the knives.

In the annexed drawings, similar letters have reference to corresponding parts in all the figures.

Figure 1, is a side elevation of the machine. Fig. 2, is a front elevation. Fig. 3, is a longitudinal section. Fig. 4, is a transverse section through the trough immediately behind the knives.

$a$ is a sill from which arise two standards $b$, which at about their midheight inclose and support between them the forward end of the feeding trough $c$. The rear end of this trough is supported by two standards $d$, in the usual manner.

$e$, is a stationary blade so fixed athwart the standards $b$ as to bring its upper edge about level with the floor $f$ of the trough.

$g$, is the mowing knife, the line of whose edge recedes upward from the extremities to the center in a curve approaching that of a parabola so as to have a shears cut without having any tendency whatever to a lateral surge. This knife is confined to a vertical play by a pair of V-shaped guide rods $h$ to which the said knife is secured, whose sockets, or bearing, or guide plates $h^1$ have an adjustable attachment $i$, to the standards $b$, so that the knife $g$, can be set to the stationary blade $e$ as their surfaces wear. Two cross bars extend across from rod to rod, one bar $j$ uniting the upper extremities of the rods, and the other $k$, uniting their lower extremities.

A bolt $l$, passing through both the upper cross bar $j$, and the middle of the knife $g$, attaches thereto a pitman $m$, operated by a crank shaft, winch, and balance wheel $n$, parallel to the upper part of the standards.

Bolted to and projecting back from the lower cross bar $k$, is a pair of arms $o$, $o$, to which is pivoted a stirrup $p$ terminating in screw shank $p^1$, to which the feed hand (consisting of a wooden or metallic plate armed with fingers $r$) is attached and adjusted to any required height by a pair of nuts $s$ on each shank.

The stirrup has projecting forward from its middle portion a tongue $t$, having vertical play in a grooved plate $u$. Fixed athwart this grooved plate are two pins $v$, $w$, the upper one $v$, serving to trip the feed hand forward after its teeth or fingers have entered the hay or straw, and the lower one to trip it back again preparatory to a repetition of the upward, or feed motion.

There are different holes in the grooved plate for the insertion of the pins $v$, $w$, that the tripping action of the feed hand may be rendered adjustable. $x$ is a board placed immediately over the feed hand to assist its entry into the straw or hay.

The operation is very obvious and simple: The trough being supplied with a bundle of hay or straw, and the contents pushed forward until they come in contact with the knives. The winch is then rotated and the knife gate in its upward stroke carries the feed hand along with it; the tongue on which encountering the pin $v$ just as the feed hand has buried itself in the hay or straw—the feed hand has tripped forcibly forward sufficiently to push the requisite quantity of hay or straw forward upon the stationary blade where it is chopped off by the descending knife; meanwhile the peculiar shaking motion communicated by the feed hand to the straw or hay tends to rid it of such refractory matters as are apt to injure the knives. Wires may be made to cross the space in the bottom of the trough in order to facilitate the operation of feeding.

Having thus fully described the nature of my invention and improvement I disclaim originality of invention to the bow-shaped and vertically acting knife attached to a sliding reciprocating gate, and to attaching the feed hand to the reciprocating gate above the trough with solid bottom. But

What I do claim as new and of my invention and desire to secure by Letters Patent is—

Attaching the feed hand to the reciprocating knife gate below the bottom of the feed trough, when said bottom is made with an opening next the knife, in which the feed hand operates and through which all extraneous and hard substances descend before reaching the knife, so that while the said feed hand acts on the hay or straw, or whatever it to be cut at its most compact part it at the same time offers no obstruction to the insertion of the straw as it stands entirely out of the way, and leaves the top open and free, the opening in the bottom of the trough serving to rid the hay or straw or corn stalks of sticks, stones, and other objectionable substances which would tend to injure the knives.

In testimony whereof I have hereunto signed my name before two subscribing witnesses.

DAVID STILES, Jr.

Witnesses:
E. S. PHELPS,
WILLIAM L. GRIFFIN.